United States Patent
Dudda et al.

(10) Patent No.: US 11,133,898 B2
(45) Date of Patent: Sep. 28, 2021

(54) RETRANSMISSION HANDLING AT TTI LENGTH SWITCH

(71) Applicant: Telefonaktiebolaget LM Ericsson (publ), Stockholm (SE)

(72) Inventors: Torsten Dudda, Aachen (DE); Malik Wahaj Arshad, Upplands Vasby (SE); Laetitia Falconetti, Järfälla (SE); Robert Karlsson, Sundbyberg (SE); Gustav Wikström, Taby (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/316,211

(22) PCT Filed: Jan. 26, 2018

(86) PCT No.: PCT/EP2018/051931
§ 371 (c)(1),
(2) Date: Jan. 8, 2019

(87) PCT Pub. No.: WO2018/141643
PCT Pub. Date: Aug. 9, 2018

(65) Prior Publication Data
US 2019/0238278 A1    Aug. 1, 2019

Related U.S. Application Data

(60) Provisional application No. 62/454,227, filed on Feb. 3, 2017.

(51) Int. Cl.
*H04L 1/18*    (2006.01)
*H04W 80/02*    (2009.01)
(Continued)

(52) U.S. Cl.
CPC .......... *H04L 1/1819* (2013.01); *H04L 1/1822* (2013.01); *H04L 1/1825* (2013.01);
(Continued)

(58) Field of Classification Search
CPC ... H04L 1/1887; H04L 1/1893; H04L 1/1896; H04L 5/0055; H04L 1/1848;
(Continued)

(56) References Cited

U.S. PATENT DOCUMENTS

| | | | |
|---|---|---|---|
| 2006/0034285 A1* | 2/2006 | Pirskanen | H04L 1/1887 370/394 |
| 2008/0010578 A1* | 1/2008 | Jiang | H04L 1/1848 714/748 |

(Continued)

FOREIGN PATENT DOCUMENTS

| | | |
|---|---|---|
| CN | 1722652 A | 1/2006 |
| CN | 101309129 A | 11/2008 |

(Continued)

OTHER PUBLICATIONS

International Search Report and Written Opinion dated Jun. 25, 2018 for International Application No. PCT/EP2018/051931 filed on Jan. 26, 2018, consisting of 14-pages.

(Continued)

*Primary Examiner* — Harun Chowdhury
(74) *Attorney, Agent, or Firm* — Christopher & Weisberg, P.A.

(57) ABSTRACT

A network node, a wireless device for communication with a network node and corresponding methods are provided. The network node includes processing circuitry configured to stop a hybrid automatic repeat request (HARQ) process associated with data to be retransmitted and retransmit the data using a procedure that is different from the stopped HARQ process.

27 Claims, 6 Drawing Sheets

(51) Int. Cl.
    *H04L 5/00*     (2006.01)
    *H04L 1/00*     (2006.01)

(52) U.S. Cl.
    CPC .......... *H04L 1/1835* (2013.01); *H04L 1/1864* (2013.01); *H04L 1/1896* (2013.01); *H04L 5/0055* (2013.01); *H04L 5/0082* (2013.01); *H04W 80/02* (2013.01); *H04L 1/0007* (2013.01)

(58) Field of Classification Search
    CPC ... H04L 1/1819; H04L 1/1864; H04L 5/0082; H04W 72/0413; H04W 72/042; H04W 72/14
    USPC ......... 370/252, 280, 329, 394; 714/748, 749
    See application file for complete search history.

(56) References Cited

U.S. PATENT DOCUMENTS

| | | | |
|---|---|---|---|
| 2009/0307552 A1* | 12/2009 | Harada | H04L 1/1887 714/748 |
| 2013/0067293 A1 | 3/2013 | Somasundaram et al. | |
| 2015/0092631 A1 | 4/2015 | Meng et al. | |
| 2016/0261382 A1* | 9/2016 | Vajapeyam | H04L 5/0055 |
| 2018/0206232 A1* | 7/2018 | Takeda | H04L 1/1887 |
| 2018/0255543 A1* | 9/2018 | Takeda | H04W 72/0413 |

FOREIGN PATENT DOCUMENTS

| | | |
|---|---|---|
| CN | 103313270 A | 9/2013 |
| CN | 104254995 A | 12/2014 |
| EP | 1594246 A2 | 11/2005 |
| EP | 2267929 A2 | 12/2010 |
| WO | 2008141484 A1 | 11/2008 |

OTHER PUBLICATIONS

3GPP TSG RAN Meeting #72 RP-161299; Title: New Work Item on shortened TTI and processing time for LTE; Source: Ericsson; Document for: Approval; Agenda Item: 10.1.1; Location and Date: Busan, Korea Jun. 13-16, 2016, consisting of 9-pages.

European Search Report dated Jul. 29, 2020 for Application No. 18 702 229.0, consisting of 8-pages.

Chinese Office Action and Search Report with English Summary Translation dated Aug. 2, 2021 for Patent Application No. 201880021059.5.

Sun Xiaotong et al.; Study on System Latency Reduction Based on Shorten TTI; 2016 IEEE 13th International Conference on Signal Processing (ICSP), 2016, consisting of 5-pages.

Bai Qing et al.; Key Technologies for Network Latency Improvement of Next Generation; Shanghai Bell Co., Ltd. Shanghai 2011, Issue 1, 2017, consisting of 4-pages.

* cited by examiner

RETRANSMISSION HANDLING AT TTI LENGTH SWITCH

CROSS-REFERENCE TO RELATED APPLICATIONS

This application is a Submission Under 35 U.S.C. § 371 for U.S. National Stage Patent Application of International Application Number: PCT/EP2018/051931, filed Jan. 26, 2018 entitled "RETRANSMISSION HANDLING AT TTI LENGTH SWITCH," which claims priority to U.S. Provisional Application No. 62/454,227, filed Feb. 3, 2017, entitled "RETRANSMISSION HANDLING AT TTI LENGTH SWITCH," the entireties of both of which are incorporated herein by reference.

TECHNICAL FIELD

The disclosure relates to wireless communications, and in particular, to retransmission handling at a change in transmission time interval length.

BACKGROUND

Existing Long Term Evolution (LTE) is based on a frame structure of so-called subframes of 1 ms length consisting of 14 Orthogonal Frequency Division Multiplexing (OFDM) symbols. In the downlink (DL), a 0-3 OFDM symbol control channel physical downlink control channel (PDCCH) and the rest of OFDM symbols for the data channel such as a physical downlink shared channel (PDSCH) are included. In the uplink (UL), all symbols can be used for the uplink data channel physical uplink shared channel (PUSCH), while some resources may be used for the control channel such as a physical uplink control channel (PUCCH) and reference symbols.

Existing work is ongoing on standardizing "short transmission time interval" (sTTI) operation, where scheduling and transmission can be done on a faster timescale. Therefore, the legacy LTE subframe is subdivided into several sTTIs. Supported lengths for the sTTI of 2 and 7 OFDM symbols are under investigation. Data transmission in the DL may happen per sTTI via the short PDSCH (sPDSCH), which may include a control region short physical downlink control channel (sPDCCH). In the UL, data is transmitted per sTTI via short PUSCH (sPUSCH). Control can be transmitted via short PUCCH (sPUCCH).

LTE supports hybrid automated repeat request (HARQ) transmissions on the medium access control (MAC) layer for retransmission handling, using multiple stop-and-wait HARQ processes. In the DL, HARQ is asynchronous, meaning that the scheduler can indicate which HARQ process is used for transmission or retransmission. In the UL, for legacy TTI operation, HARQ is synchronous, meaning that subsequent HARQ processes follow a predefined order. For the UL and short TTIs, it is possible that UL HARQ will be asynchronous. Furthermore, for legacy TTIs a, 8 HARQ processes are supported, while for short TTIs, support for a higher number of 16 HARQ processes is likely.

SUMMARY

Some embodiments advantageously provide a method, network node and wireless device for retransmission handling at a transmission time length switch or change.

According to one aspect of the disclosure, a network node is provided. The network node includes processing circuitry in which the processing circuitry is configured to stop a hybrid automatic repeat request, HARQ, process associated with data to be retransmitted, and retransmit the data using a procedure that is different from the stopped HARQ process.

According to one embodiment of this aspect, the stopped HARQ process is a procedure on a Medium Access Control, MAC, layer and/or the procedure that is different from the stopped HARQ process is a procedure on a Radio Link Control, RLC, layer. According to one embodiment of this aspect, the processing circuitry is further configured to communicate a trigger at a level higher than a Medium Access Control, MAC, layer to cause transmission of the data using the procedure that is different from the stopped HARQ process.

According to one embodiment of this aspect, the trigger is a Radio Link Control, RLC, trigger that is communicated from the MAC layer to a Radio Link Control, RLC, layer. According to one embodiment of this aspect, the processing circuitry is further configured to indicate a change in Transmission Time Interval, TTI, length. In some aspects, the retransmitting using the different procedure is on a TTI length which is changed from a TTI length of the stopped HARQ process. According to one embodiment of this aspect, the change in TTI length causes a change in a number of HARQ process quantity. According to one embodiment of this aspect, the indication of the change of the TTI length is included in a downlink assignment. According to one embodiment of this aspect, the processing circuitry is further configured to at least partially flush the stopped HARQ process. According to one embodiment of this aspect, the stopped HARQ process associated with data to be retransmitted is associated with at least one communicated NACK.

According to one aspect of the disclosure, a wireless device including processing circuitry is provided. The processing circuitry is configured to stop a hybrid automatic repeat request, HARQ, process associated with data to be retransmitted, and receive retransmitted data based on a procedure that is different from the stopped HARQ process.

According to one embodiment of this aspect, the stopped HARQ process is a procedure on a Medium Access Control, MAC, layer and/or the procedure that is different from the stopped HARQ process is a procedure on a Radio Link Control, RLC, layer. According to one embodiment of this aspect, the processing circuitry is further configured to receive an indication corresponding to a change in Transmission Time Interval, TTI, length.

According to one embodiment of this aspect, the change in TTI length causes a change in a number of HARQ process quantity. According to one embodiment of this aspect, the indication of the change of the TTI length is included in a downlink assignment. According to one embodiment of this aspect, the processing circuitry is further configured to at least partially flush the stopped HARQ process. According to one embodiment of this aspect, the stopped HARQ process associated with data to be retransmitted is associated with at least one communicated NACK.

According to one aspect of the disclosure, a network node is provided. The network node includes processing circuitry. The processing circuitry is configured to stop a Hybrid automatic repeat request, HARQ, process associated with data to be retransmitted, and receive retransmission of data in which the retransmission of data is triggered based on a change of a TTI length for transmission and associated with a procedure that is different from the stopped HARQ process.

According to one embodiment of this aspect, the stopped HARQ process is a procedure on a Medium Access Control, MAC, layer and/or the procedure that is different from the stopped HARQ process is a procedure on a Radio Link Control, RLC, layer. According to one embodiment of this aspect, the processing circuitry is further configured to indicate a change in Transmission Time Interval, TTI, length. According to one embodiment of this aspect, the change in TTI length causes a change in a number of HARQ process quantity.

According to one embodiment of this aspect, the indication of the change of the TTI length is included in an uplink grant. According to one embodiment of this aspect, the processing circuitry is further configured to at least partially flush the stopped HARQ process. According to one embodiment of this aspect, the stopped HARQ process associated with data to be retransmitted is associated with at least one communicated NACK.

According to one embodiment of the disclosure, a wireless device includes processing circuitry. The processing circuitry is configured to stop a hybrid automatic repeat request, HARQ, process associated with data to be retransmitted, and retransmit the data. The retransmission of data is triggered based on a change of a Transmission Time Interval, TTI, length and associated with a procedure that is different from the stopped HARQ process.

According to one embodiment of this aspect, the stopped HARQ process is a procedure on a Medium Access Control, MAC, layer and/or the procedure that is different from the stopped HARQ process is a procedure on a Radio Link Control, RLC, layer. According to one embodiment of this aspect, the processing circuitry is further configured to receive an indication of a change in Transmission Time Interval, TTI, length.

According to one embodiment of this aspect, the change in TTI length causes a change in a number of HARQ process quantity. According to one embodiment of this aspect, the indication of the change of the TTI length is included in an uplink assignment. According to one embodiment of this aspect, the processing circuitry is further configured to at least partially flush the stopped HARQ process. According to one embodiment of this aspect, the stopped HARQ process associated with data to be retransmitted is associated with at least one communicated NACK.

According to one aspect of the disclosure, a method for a network node is provided. A hybrid automatic repeat request, HARQ, process associated with data to be retransmitted is stopped. The data is retransmitted using a procedure that is different from the stopped HARQ process.

According to one embodiment of this aspect, the stopped HARQ process is a procedure on a Medium Access Control, MAC, layer and/or the procedure that is different from the stopped HARQ process is a procedure on a Radio Link Control, RLC, layer. According to one embodiment of this aspect, a trigger at a level higher than a Medium Access Control, MAC, layer is communicated to cause transmission of the data using the procedure that is different from the stopped HARQ process. According to one embodiment of this aspect, the trigger is a Radio Link Control, RLC, trigger that is communicated from the MAC layer to a Radio Link Control, RLC, layer.

According to one embodiment of this aspect, a change in Transmission Time Interval, TTI, length is indicated. According to one embodiment of this aspect, the change in TTI length causes a change in a number of HARQ process quantity. According to one embodiment of this aspect, the indication of the change of the TTI length is included in a downlink assignment. According to one embodiment of this aspect, the stopped HARQ process is at least partially flushed.

According to one embodiment of this aspect, the stopped HARQ process associated with data to be retransmitted is associated with at least one communicated NACK. According to one aspect of the disclosure, a method for a wireless device is provided. A hybrid automatic repeat request, HARQ, process associated with data to be retransmitted is stopped. Retransmitted data is received based on a procedure that is different from the stopped HARQ process. According to one embodiment of this aspect, the stopped HARQ process is a procedure on a Medium Access Control, MAC, layer and/or the procedure that is different from the stopped HARQ process is a procedure on a Radio Link Control, RLC, layer.

According to one embodiment of this aspect, an indication corresponding to a change in Transmission Time Interval, TTI, length is received. According to one embodiment of this aspect, the change in TTI length causes a change in a number of HARQ process quantity. According to one embodiment of this aspect, the indication of the change of the TTI length is included in a downlink assignment. According to one embodiment of this aspect, the stopped HARQ process is at least partially flushed. According to one embodiment of this aspect, the stopped HARQ process associated with data to be retransmitted is associated with at least one communicated NACK.

According to one aspect of the disclosure, a method for a network node is provided. A Hybrid automatic repeat request, HARQ, process associated with data to be retransmitted is stopped. Retransmission of data is received. The retransmission of data is triggered based on a change of a TTI length for transmission and associated with a procedure that is different from the stopped HARQ process. According to one embodiment of this aspect, the stopped HARQ process is a procedure on a Medium Access Control, MAC, layer and/or the procedure that is different from the stopped HARQ process is a procedure on a Radio Link Control, RLC, layer.

According to one embodiment of this aspect, a change in Transmission Time Interval, TTI, length is indicated. According to one embodiment of this aspect, the change in TTI length causes a change in a number of HARQ process quantity. According to one embodiment of this aspect, the indication of the change of the TTI length is included in an uplink grant. According to one embodiment of this aspect, the stopped HARQ process is at least partially flushed. According to one embodiment of this aspect, the stopped HARQ process associated with data to be retransmitted is associated with at least one communicated NACK.

According to one embodiment of the disclose, a method for wireless device is provided. A hybrid automatic repeat request, HARQ, process associated with data to be retransmitted is stopped. The data is retransmitted. The retransmission of data is triggered based on a change of a Transmission Time Interval, TTI, length and associated with a procedure that is different from the stopped HARQ process.

According to one embodiment of this aspect, the stopped HARQ process is a procedure on a Medium Access Control, MAC, layer and/or the procedure that is different from the stopped HARQ process is a procedure on a Radio Link Control, RLC, layer. According to one embodiment of this aspect, an indication of a change in Transmission Time Interval, TTI, length is received.

According to one embodiment of this aspect, the change in TTI length causes a change in a number of HARQ process quantity. According to one embodiment of this aspect, the indication of the change of the TTI length is included in an uplink assignment. According to one embodiment of this aspect, the stopped HARQ process is at least partially flushed. According to one embodiment of this aspect, the stopped HARQ process associated with data to be retransmitted is associated with at least one communicated NACK.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
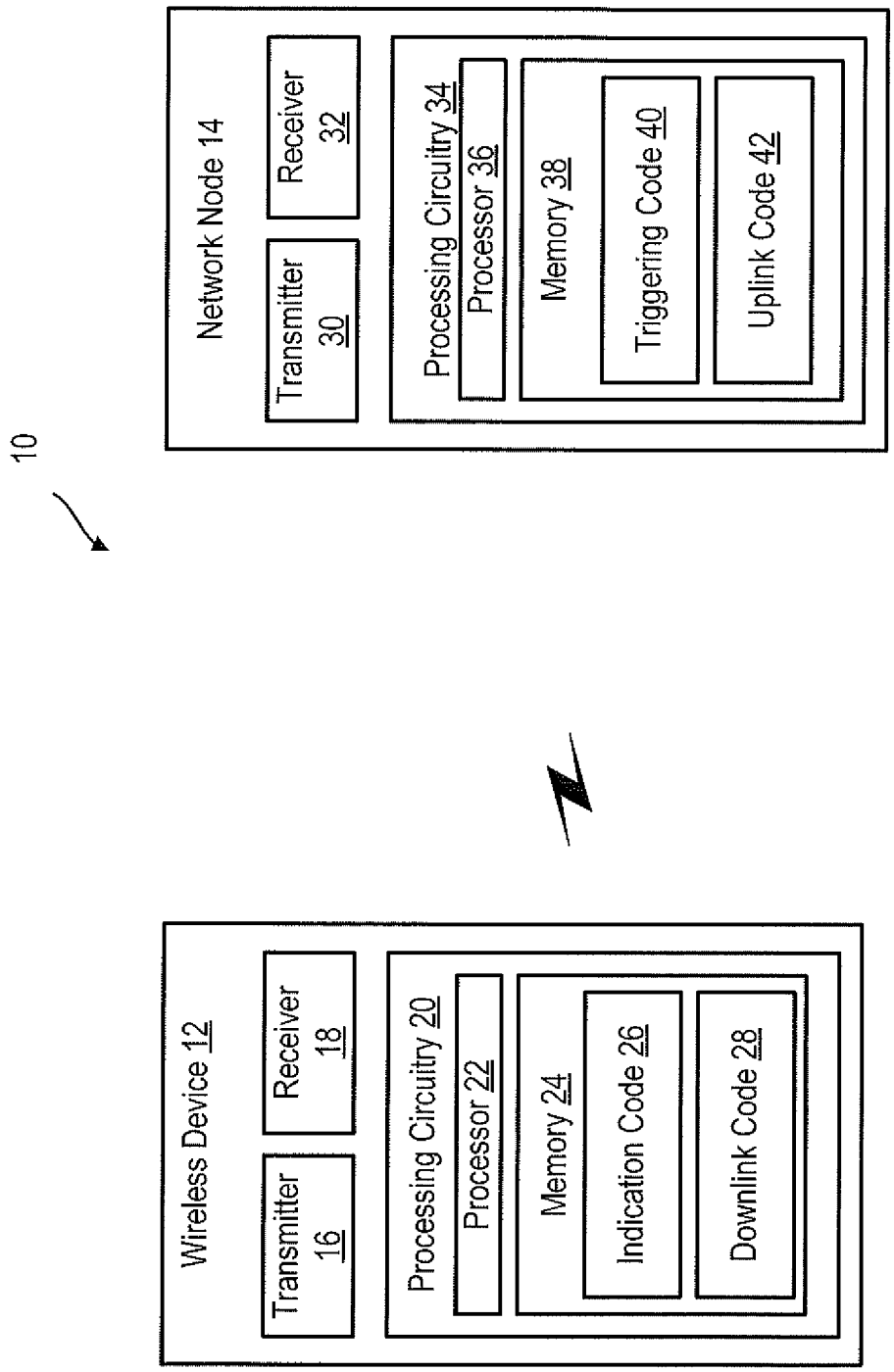
FIG. 1 is a block diagram of an exemplary system for retransmission handling at transmission time length switch or change in accordance with the principles of the disclosure.

It is likely that the wireless device can be dynamically (with a subframe to subframe granularity) be scheduled with legacy TTI and short TTI. This implies a switch between long and short TTI length and vice versa without MAC reset. However, it is unclear how switching between TTI lengths, potentially also implying a switch between the supported number of HARQ processes, can be handled on the MAC layer efficiently, i.e. without delaying data delivery due to the changed HARQ process in which the HARQ processes before the switch are lost or not applicable after the switch occurs. Such data loss of the HARQ processes happens for instance if separate HARQ processes are used for different TTI lengths. In that case, a switch from one TTI length to another means that the HARQ processes used in the previous TTI length can no longer be addressed and is lost. For example, a switch to fewer HARQ processes may lead to data being associated with HARQ processes that no longer exist, which could delay retransmission of this data. Therefore, potential remaining data in the buffers corresponding to the previous HARQ processes that no longer exist after the switch is lost. Higher layers (radio link control (RLC)) may recover from this loss by retransmissions, but RLC is triggered by RLC-internal procedures (e.g. periodic timer), which induces a significant delay.

Another example where such data loss on HARQ happens is when the HARQ processes are shared between different TTI lengths but there is a smaller number of HARQ processes in the TTI length after the switch than before the switch. In that case, the HARQ processes that existed with the previous TTI length but do not exist with the TTI length after switch can no longer be addressed. Potential remaining data in the buffers corresponding to the previous HARQ processes is lost. Higher layers such as radio link control (RLC) layers may recover from this loss by retransmissions, which are however triggered by RLC-internal procedures (e.g. reordering timer or periodic timer), which induces a significant delay.

Note that switching of the number of HARQ processes may occur jointly with a TTI length switch, or with a switch between legacy and reduced processing time ("n+3") behavior. In these cases, data loss on HARQ may occur and:
  retransmissions on a short TTI, of data first sent on HARQ with a big transport block size in a long TTI, may not be efficient because the number of coded bits will be smaller;
  retransmissions on a long TTI, of data first sent on HARQ with a small transport block size in a short TTI, may be inefficient as the number of coded bits will be larger; and
  retransmissions of data sent on HARQ with a certain process index cannot be done when the number of used HARQ processes is reconfigured to a smaller number. In this case, the used HARQ process from before the reconfiguration may not be addressable anymore.

The disclosure solves the problems with existing systems. In particular, the disclosure describes a method for efficient retransmission of unacknowledged HARQ data at TTI length switching time or switching between a number of HARQ processes. When the MAC transmitter decides upon or receives an indication to switch the TTI length, the transmitter flushes or clears its HARQ processes and sends a local negative acknowledgement (NACK) indication to the RLC layer about data lost within these processes. Then the RLC layer can quickly retransmit the data via newly established HARQ processes after the TTI switch. For example, retransmission occurs at the RLC layer, where, in one or more embodiments, the HARQ process is flushed by setting another process (e.g., a newly established process) to be where data was held such that new transmission is started based on retransmission at the RLC layer. As such, the HARQ process on a first TTI length is stopped at the time of the TTI length switch, and retransmission of the data using the different procedure is on a switched, or second, TTI length different to the first TTI length. Thus, aspects of the disclosure provide for retransmission handling at TTI length switch.

The disclosure advantageously provides for the switching of TTI lengths to be handled efficiently, i.e. does not lead to unwanted delay spikes for the data delivery (which was due to data loss during a TTI length switch at MAC). This way, specific low-latency and reliable communication use case requirements can be guaranteed enabling e.g. new critical machine communication use cases.

The present disclosure is described within the context of LTE, i.e. E-UTRAN. It should be understood that the problems and solutions described herein are equally applicable to wireless access networks and wireless devices implementing other access technologies and standards (e.g. 5G New Radio (NR)). LTE is used as an example technology where the disclosure is suitable, and using LTE in the description therefore is particularly useful for understanding the problem and solutions for solving the problem.

Before describing in detail exemplary embodiments, it is noted that the embodiments reside primarily in combinations of apparatus components and processing steps related to retransmission handling at TTI length switch. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system for retransmission handling. System 10 includes one or more one or more wireless devices 12 and one or more network nodes 14, in communication with each other via one or more communication networks, paths and/or links using one or more communication protocols such as LTE based protocols.

Wireless device 12 includes transmitter 16 and receiver 18 for communicating with network node 14, other wireless devices and/or other entities in system 10. In one or more embodiments, transmitter 16 and receiver 18 includes or is replaced by one or more communication interfaces.

Wireless device 12 includes processing circuitry 20. Processing circuitry 20 includes processor 22 and memory 24. In addition to a traditional processor and memory, processing circuitry 20 may comprise integrated circuitry for processing and/or control, e.g., one or more processors and/or processor cores and/or FPGAs (Field Programmable Gate Array) and/or ASICs (Application Specific Integrated Circuitry). Processor 22 may be configured to access (e.g., write to and/or reading from) memory 24, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 22 and/or other data, e.g., data pertaining to communication, e.g., configuration and/or address data of nodes, etc.

Processing circuitry 20 may be configured to control any of the methods and/or processes described herein and/or to cause such methods, signaling and/or processes to be performed, e.g., by wireless device 12. Processor 22 corresponds to one or more processors 22 for performing wireless device 12 functions described herein. Wireless device 12 includes memory 24 that is configured to store data, programmatic software code and/or other information described herein. In one or more embodiments, memory 24 is configured to store indication code 26 and downlink code. For example, indication code 26 includes instructions that, when executed by processor 22, causes processor 22 to perform the signaling describe herein with respect to wireless device 12.

Wireless device 12 may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Network node 14 includes transmitter 30 and receiver 32 for communicating with wireless device 12, other network nodes 14 and/or other entities in system 10. In one or more embodiments, transmitter 30 and receiver 32 includes or is replaced by one or more communication interfaces.

Network node 14 includes processing circuitry 34. Processing circuitry 34 includes processor 36 and memory 38. In addition to a traditional processor and memory, processing circuitry 34 may comprise integrated circuitry for processing and/or control, e.g., one or more processors and/or processor cores and/or FPGAs (Field Programmable Gate Array) and/or ASICs (Application Specific Integrated Circuitry). Processor 36 may be configured to access (e.g., write to and/or reading from) memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 38 may be configured to store code executable by processor 36 and/or other data, e.g., data pertaining to communication, e.g., configuration and/or address data of nodes, etc.

Processing circuitry 34 may be configured to control any of the methods and/or processes described herein and/or to cause such methods, signaling and/or processes to be performed, e.g., by network node 14. Processor 36 corresponds to one or more processors 36 for performing network node 14 functions described herein. Network node 14 includes memory 38 that is configured to store data, programmatic software code and/or other information described herein. In one or more embodiments, memory 38 is configured to store triggering code 40 and uplink code 42. For example, triggering code 40 includes instructions that, when executed by processor 36, causes processor 36 to perform the processes describe herein with respect to network node 14. In another example, uplink code 42 includes instructions that, when executed by processor 36, causes processor 36 to perform the processes describe herein with respect to network node 14.

The term "network node 14" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices locally or across a network cloud such as a backhaul network and/or the Internet.

The disclosure provides a method, wireless device and network node for efficient retransmission handling in case of switching between TTI lengths, or between used number of HARQ processes. In one or more embodiments, retransmissions are triggered on RLC protocol layer or RLC layer. This way data to be retransmitted can be multiplexed again to different transport block sizes and to different HARQ processes. In one or more embodiments, one or more of the below local indications from MAC to RLC layer are used for triggering the RLC layer procedure:

NACK is indicated from MAC to RLC (locally, i.e., local NACK) indicating all HARQ data is lost and all RLC data will need to be retransmitted NACK is indicated from MAC to RLC (locally, i.e., local NACK) for all RLC data units contained in all current HARQ processes or HARQ transmit buffers.

NACK is indicated from MAC to RLC (locally, i.e., local NACK) for all RLC data units contained in those current HARQ processes or HARQ transmit buffers that are flushed or not available anymore after the switch, or those that are in NACK status.

In one or more embodiments, the local indication has the format of an RLC status report. This way, the defined RLC status report reception method in existing systems in RLC can be reused with the local indication that has been formatted as an RLC status report. The RLC will then retransmit RLC data not yet acknowledged at the RLC level/layer. In one or more other embodiments, besides triggering retransmissions at the RLC layer, by the local NACK at the "switch", the "switch" may also trigger transmission of an RLC status report. In one or more embodiments, the "switch" refers to the triggering event that triggers the local MAC indication, i.e., local indication. In one or more embodiments, the switch, triggering the local MAC indication, can be at least one of the following events:

TTI length for DL and/or UL is reconfigured, e.g., by RRC indication.

TTI length for DL and/or UL is changed by DL assignment or UL grant reception, e.g., through Physical Downlink Control Channel (PDCCH)/Enhanced Physical Downlink Control Channel (EPDCCH) or short PDCCH (sPDCCH).

The number of used HARQ processes is changed, e.g. from 16 to 8 or vice versa.

In one or more embodiments, the switch or triggering of the local MAC indication is conditional depending on whether:

the TTI length is switched from short TTI (sTTI) to long TTI or from long to short TTI (sTTI); and/or the HARQ process number is switched from high number to low number (HARQ process number reduction), or low number to higher number (HARQ process number increase).

Not considering the direction of change, e.g., short to long (vice versa) or high to low (vice versa), has the advantage of a unified behavior, while considering the condition has the advantage of triggering the local indication only when needed, avoiding redundant higher layer retransmissions.

At the time of the switching, beside the local indication to RLC to trigger retransmissions, a partial MAC reset may be done, i.e., the HARQ entity and all its processes or a subset of the HARQ processes are flushed or cleared. This applies to both transmitter 16 and/or 30 and receiver 18 and/or 32. In detail, wireless device 12 may do one or more of:

set the new data indicators (NDIs) for all (or a subset of) uplink HARQ processes to the value 0;

consider the received HARQ feedback for all (or a subset of) uplink HARQ processes to be acknowledged (ACKed). This way synchronous retransmissions of potentially not ACKed HARQ processes are avoided;

flush the soft buffers for all (or a subset of) DL HARQ processes; and for each (or a subset of) DL HARQ processes, consider the next received transmission for a Transport Block (TB) as the very first transmission.

To identify the subset of HARQ processes to be considered, wireless device 12 may for example select the processes not addressable anymore at a HARQ number of processes reconfiguration, e.g., for reconfiguration from 16 to 8, consider the subset of processes 8-15 (if numbered from 0 to 15). Alternatively, wireless device 12 should consider an indication from network node 14 indicating the HARQ processes to be considered. Alternatively, wireless device 12 can do differently for ACKed HARQ processes (wireless device 12 can wait for normal RLC status reports hoping packets or data was correctly received in network node 14) and NACKed HARQ processes (where an immediate local RLC retransmission occurs or is triggered). As a further alternative, wireless device 12 may consider only the HARQ process indicated for reception in the DL assignment or for transmission in the UL grant.

Network node 14 may trigger an RLC status report for the UL, to be sent to wireless device 12, for example if one or more UL HARQ processes are being used (have been received in error, or have not yet been decoded by network node 14) at the switch. In one or more embodiments, whether wireless device 12 applies the described behavior is configurable by RRC, i.e., indication from network node 14, or whether wireless device 12 has a certain capability or a certain support for a number of HARQ processes.

In one or more embodiments, the switch from asynchronous to synchronous HARQ operation is also considered as the disclosure involves flushing the HARQ processes at the time of a switch, i.e., upon triggering of the local indication, and compensating for it by retransmissions on RLC via local NACK.

Figure 2:
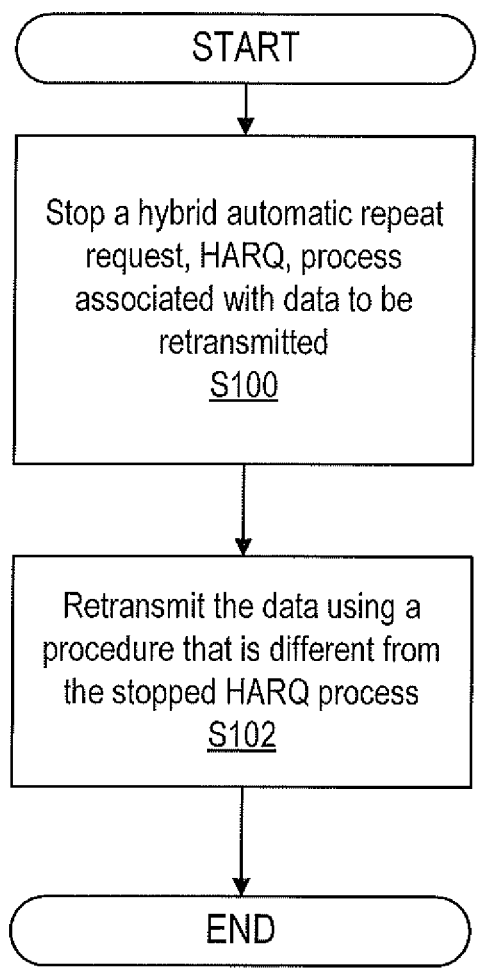
FIG. 2 is a flow chart of an exemplary triggering process in accordance with the principles of the disclosure.

FIG. 2 is a block diagram of an exemplary triggering process of triggering code 40 in accordance with the principles of the disclosure. Processing circuitry 34 is configured to stop a HARQ process associated with data to be retransmitted (Block S100). In one or more embodiments, the stopped HARQ process is a MAC process, i.e., "MAC process" as used herein refers to a procedure at a MAC layer where the procedure may include transmission and/or retransmission. In some aspects, the stopping of the HARQ process is at one of change of a Transmission Time Interval (TTI) length for transmission and/or change a number of used HARQ processes. Processing circuitry 34 is also configured to retransmit the data using a procedure that is different from the stopped HARQ process (Block S102). In one or more embodiments, the process different from the stopped HARQ process is at a different layer than the layer of the stopped HARQ process, for example, the procedure that is different from the stopped HARQ process is at a different layer than the layer of the stopped HARQ process. In other words, MAC layer transmissions and/or retransmissions are stopped, and then retransmissions are triggered on the RLC layer. In some aspects, the procedure that is different from the stopped HARQ process is on a different TTI length than the TTI length of the stopped HARQ process. In some aspects, the retransmission using the different procedure is on the changed (i.e. new) TTI length.

In one or more embodiments, processing circuitry 34 is configured to transmit signaling. In one or more embodiments, the signaling is a triggering event that is configured to cause the current HARQ process to be stopped for data to be retransmitted such that the data is retransmitted using a different process from the stopped HARQ process, i.e., using a procedure that is different from the stopped HARQ process. In one or more embodiments, the "different process" from the stopped HARQ process is a newly established HARQ process. In one or more embodiments, the signaling is configured to cause wireless device 12 to one of change a Transmission Time Interval (TTI) length for transmission and change a number of used HARQ processes. In one or more embodiment, the signaling is an assignment that is configured to cause wireless device 12 to one of: change a TTI length for transmission and change a number of used HARQ processes. In one or more embodiments, the assignment is a downlink assignment. In one or more embodiments, the signaling is radio resource control (RRC) signaling. In one or more embodiments, the change in TTI length for transmission includes switching between TTI and sTTI, and the change in the number of used HARQ processes includes changing between a first number of used HARQ processes and a second number of used HARQ processes, the first number of used HARQ processes being different from the second number of used HARQ processes.

In one or more embodiments, processing circuitry 34 is configured to increase a transport block size (TBS) indicated in the assignment for RLC transmission, and the RLC transmission is transmitted on the increased TBS. The assignment is further described in detail herein. In one or more embodiments, a local indication is communicated from a media access control (MAC) layer to a radio link control (RLC) layer based on the signaling, as discussed in detail herein, where the MAC layer is a different layer from the RLC layer. In one or more embodiments, the stopped HARQ process is a procedure at a Medium Access Control, MAC, layer and/or the procedure that is different from the stopped HARQ process is a procedure at a Radio Link Control, RLC, layer, where "procedure" may include transmission and/or retransmission. In one or more embodiments, processing circuitry 34 is further configured to, in response to the local indication communicated from the MAC layer to the RLC layer based on the assignment, clear/flush or partially clear/flush one of the first number of used HARQ processes and second of used HARQ processes. In one or more embodiment, the first number of used HARQ processes are a first number of asynchronous HARQ processes, and the second number of used HARQ processes are a second number of synchronous HARQ processes.

As discussed above, processing circuitry 34 is configured to cause retransmission of data based on the signaling. In one or more embodiments, the retransmission is RLC retransmission. In one or more embodiments, processing circuitry 34 is configured to cause retransmission of one of data in response to the communicated local indication. In one or more embodiments, the local indication is a local NACK. The local indication is further described herein.

Figure 3:
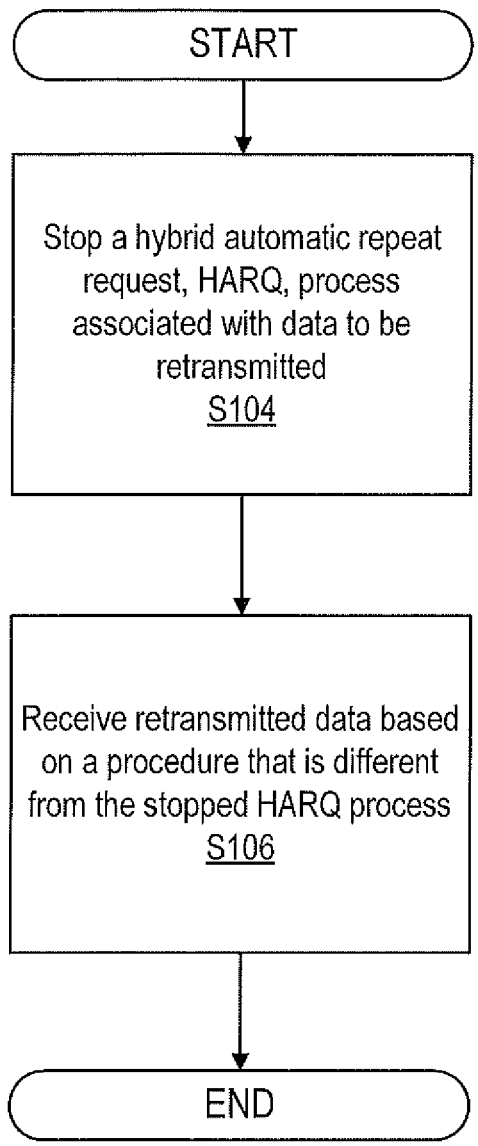
FIG. 3 is a flow chart of an exemplary downlink process in accordance with the principles of the disclosure.

FIG. 3 is a block diagram of an example downlink process performed by downlink code 28 in accordance with the principles of the disclosure. Processing circuitry 20 is configured to stop a HARQ process/processes associated with data to be retransmitted, as described herein (Block S104). In one or more embodiments, the stopped HARQ process is a MAC process, i.e., "MAC process" as used herein refers to a procedure at a MAC layer.

In some aspects, the stopping of the HARQ process is at a time of a change of a Transmission Time Interval (TTI) length for transmission and/or change a number of used HARQ processes. Processing circuitry 20 is configured to receive retransmitted data based on a procedure that is different from the stopped HARQ process (Block S106). In one or more embodiments, processing circuitry 20 is configured to receive retransmitted data based on a process different from the stopped HARQ process, as described herein. In one or more embodiments, the process/procedure that is different from the stopped HARQ process is at a different layer than the layer of the stopped HARQ process. In some aspects, the retransmission using the different procedure is on the changed (i.e. new) TTI length.

In one or more embodiments, processing circuitry 20 is configured to receive signaling that acts as a triggering event that is configured to cause the current HARQ process associated with data to be retransmitted to be stopped such that the retransmitted data is received based on a process that is different from the stopped HARQ process. In one or more embodiments, the "different process" from the stopped HARQ process is a newly established HARQ process at a different layer from the layer of the stopped HARQ process. In one or more embodiments, the signaling is radio resource control (RRC) signaling. In one or more embodiments, the signaling is configured to cause wireless device 12 to one of change a TTI length for transmission and change a number of used HARQ processes. In one or more embodiment, the first number of used HARQ processes are a first number of asynchronous HARQ processes, and the second number of used HARQ processes are a second number of synchronous HARQ processes.

In one or more embodiments, the signaling is an assignment. In one or more embodiments, the assignment is a downlink assignment. The signaling such as the assignment is further described herein. In one or more embodiments, processing circuitry 20 is further configured to clear or flush (or partially clear or flush) at least one used HARQ process associated with a NACK for retransmission of data in response to the assignment. In one or more embodiments, the received retransmission of the data is associated with one of the changed TTI length and the changed number of used HARQ processes.

Therefore, the downlink signaling between wireless device 12 and network node 14, may include one or more of the following actions:

1. Wireless device 12 on sTTI and receiving packets or data in the DL.

2. Network node 14 may receive NACK on some HARQ processes or may fail to receive an acknowledgement (ACK).

3. Signaling such as a DL assignment is sent for 1 ms TTI (n+4 or n+3); In one or more embodiments, the signaling of the switch from sTTI to TTI is a triggering event for action 4 (below), although other triggering events are possible in accordance with the teachings of the disclosure.

4. Local NACK on network node 14 sent from the MAC layer to the RLC layer for RLC PDU's mapped to NACKed HARQ processes and optionally HARQ processes waiting for HARQ feedback (for example processes that have not yet ACKed).

5. Network node 14 and wireless device 12 flush the respective HARQ processes (associated with transmit buffer at network node 14 and reception buffer at wireless device 12); in one or more embodiments, the flushing described in action 5 occurs before the local NACK in action 4.

6. RLC status report for UL may be triggered to be sent to wireless device 12; in one or more embodiments, action 6 is optional.

7. Retransmission such as RLC retransmission, i.e., a procedure at the RLC layer, at network node 14 is performed for locally NACKed PDU's (based on HARQ process mapping).

8. The scheduler can potentially increase the transport block size (TBS) indicated in the signaling, e.g., DL assignment, to quickly clear up the RLC PDUs. In one or more embodiments, increasing the TBS as described in action 8 is optional.

Figure 4:
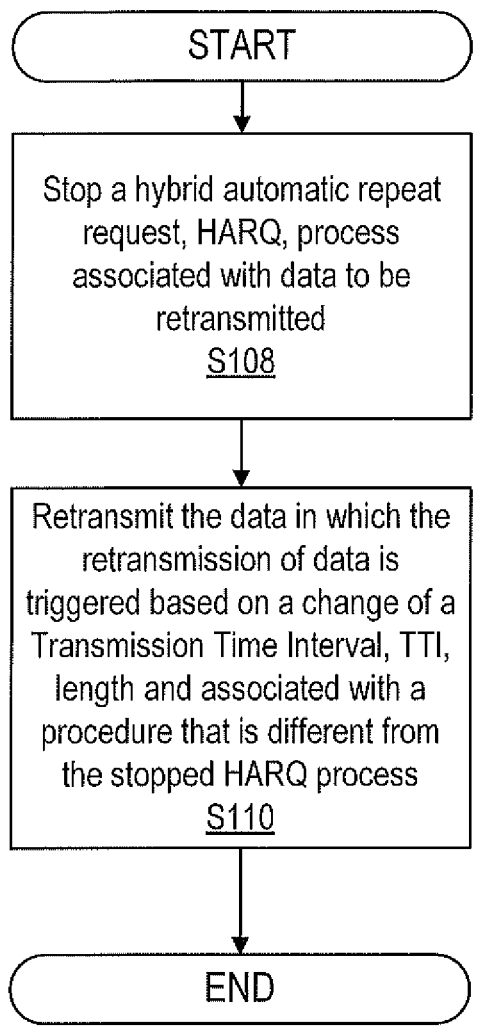
FIG. 4 is a flow chart of an exemplary indication process in accordance with the principles of the disclosure.

FIG. 4 is a flow diagram of an exemplary indication process of indication code 26 in accordance with the principles of the disclosure. Processing circuitry 20 is configured to stop a hybrid automatic repeat request, HARQ, process associated with data to be retransmitted (Block S108). In one or more embodiments, the stopped HARQ process is a MAC process, i.e., a procedure on a MAC layer. In some aspects, the time of stopping of the HARQ process is associated with (e.g. the same as) a time of a change or switch of a Transmission Time Interval (TTI) length, e.g. the stopped HARQ process used the former TTI. Processing circuitry 20 is configured to retransmit the data in which the retransmission of data is triggered based on a change of a Transmission Time Interval, TTI, length and associated with a process, i.e., procedure, that is different from the stopped HARQ process (Block S110). In one or more embodiments, the procedure that is different from the stopped HARQ process is at a different layer than the layer of the stopped HARQ process. For example, the procedure that is different from the stopped HARQ process is a procedure on a RLC layer, which is different from the layer such as a MAC layer of the stopped HARQ process. In some aspects, the retransmission using the different procedure is on the changed or switched (i.e. new) TTI length.

In one or more embodiments, processing circuitry 20 is configured to receive signaling where the signaling is a triggering event that is configured to cause the current HARQ process to be stopped for data to be retransmitted such that the data is retransmitted using a different process/procedure from the stopped HARQ process. In one or more embodiments, the "different process" from the stopped HARQ process is a newly established HARQ process. In one or more embodiments, the signaling is configured to cause wireless device 12 to one of change a TTI length for transmission and/or change a number of used HARQ processes. In one or more embodiments, the signaling is radio resource control (RRC) signaling. In one or more embodiments, the signaling is an uplink grant. In one or more embodiments, the uplink grant is configured to cause wireless device 12 to one of: change a TTI length for transmission and change a number of used HARQ processes, as described herein. In one or more embodiments, the change in TTI length for transmission includes switching between TTI and sTTI, and the change in the number of used HARQ processes includes changing between a first number of used HARQ processes and a second number of used HARQ processes. The first number of used HARQ processes is different from the second number of used HARQ processes. In one or more embodiment, the first number of used HARQ processes are a first number of asynchronous HARQ processes, and the second number of used HARQ processes are a second number of synchronous HARQ processes. In one or more embodiments, the uplink grant is for communication on the TTI.

In one or more embodiments, a local indication from a media access control (MAC) layer is communicated to a radio link control (RLC) layer based on the uplink grant. In one or more embodiments, in response to the local indication communicated from the MAC layer to the RLC layer based on the uplink grant, one of the first number of used HARQ processes and second number of used HARQ processes are cleared or flushed, or partially cleared or flushed. In one or more embodiments, processing circuitry 20 is configured to cause retransmission of data in response to one of the change of the TTI length for transmission and the change of the number of used HARQ processes. In one or more embodiments, the retransmission is RLC retransmission, i.e., a procedure on the RLC layer.

In one or more embodiments, processing circuitry 20 is configured to cause RLC retransmission of data in response to the communicated local indication. In one or more embodiments, the RLC retransmission of data in response to the communicated local indication is associated with the non-cleared one of the first HARQ processes and second HARQ processes, i.e., the HARQ process before the switching is cleared while the retransmission is associated with the HARQ process configured after the switch. In one or more embodiments, the local indication is a local NACK.

Figure 5:
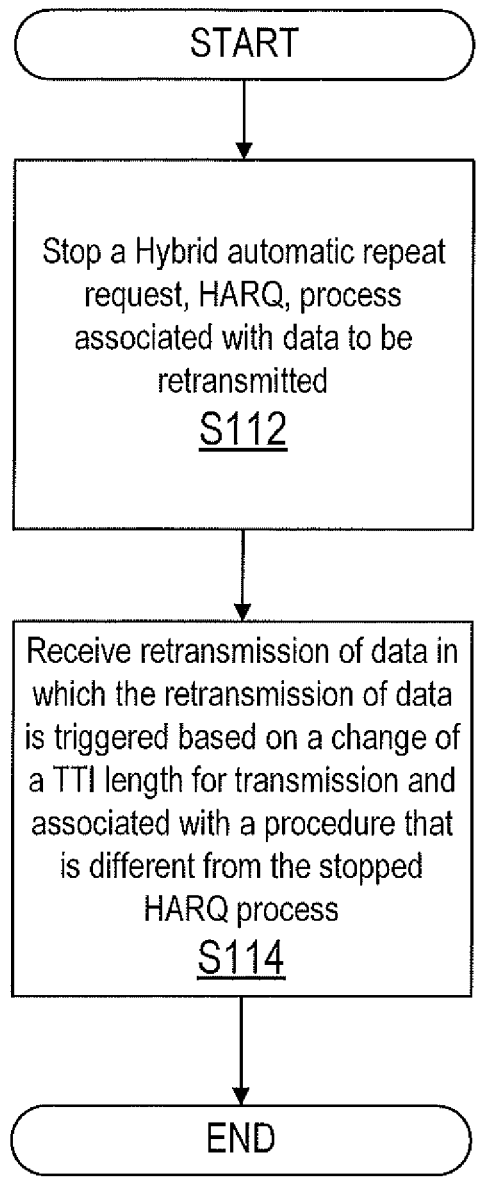
FIG. 5 is a flow chart of an exemplary uplink process in accordance with the principles of the disclosure.

FIG. 5 is a flow diagram of an exemplary uplink process of uplink code 42 in accordance with the principles of the disclosure. Processing circuitry 34 is configured to stop a HARQ process associated with data to be retransmitted, as described herein (Block S112). The stopped HARQ process was on the TTI length prior to the switch in TTI length. Processing circuitry 34 is configured to receive retransmission of data, the retransmission of data being triggered based on a change of a TTI length for transmission and associated with a process, i.e., a procedure, that is different from the stopped HARQ process, as described herein (Block S114). As such, the retransmission using the different procedure (e.g. different layer) is on the switched TTI length.

Processing circuitry 34 is configured to transmit signaling that acts as a triggering event where the triggering event is configured to cause the current HARQ process associated with data to be retransmitted to be stopped such that the retransmitted data is received based on a process, i.e., a procedure, that is different from the stopped HARQ process. In one or more embodiments, the "different process" from the stopped HARQ process is a newly established HARQ process. In one or more embodiments, the signaling is radio resource control (RRC) signaling. The signaling is configured to cause the wireless device to one of change a TTI length for transmission and change a number of used HARQ processes. In one or more embodiments, the signaling is an uplink grant. In one or more embodiments, the uplink grant configured to cause wireless device 12 to one of: change a TTI length for transmission and change a number of used HARQ processes. In one or more embodiments, processing circuitry 34 is configured to clear/flush or partially clear/flush at least one used HARQ process associated with the NACK for retransmission of the data in response to the transmitted uplink grant. In one or more embodiment, the first number of used HARQ processes are a first number of asynchronous HARQ processes, and the second number of used HARQ processes are a second number of synchronous HARQ processes.

Processing circuitry 20 is configured to receive the data (Block S114). The data is associated with one of the changed TTI length and the changed number of used HARQ processes. In one or more embodiments, the change in TTI length includes switching between TTI and sTTI, and the change in the number of used HARQ processes includes changing between a first number of used HARQ processes and a second number of used HARQ processes. The first number of used HARQ processes is different from the second number of used HARQ processes. In one or more embodiments, the uplink grant is for uplink transmission on the TTI.

Therefore, the uplink signaling between wireless device 12 and network node 14, may include one or more of the following actions:

1. wireless device 12 is using sTTI and sending packets or data in the UL.
2. wireless device 12 may receive a NACK or fail to receive a ACK on some and/or associated with HARQ process.
3. signaling such an uplink grant is received at wireless device 12 from network node 14 for 1 ms TTI (n+4 or n+3); In one or more embodiments, the signaling of the switch from sTTI to TTI is a triggering event for action 4 (below), although other triggering events are possible in accordance with the teachings of the disclosure.
4. a local NACK on wireless device 12 is sent from the MAC layer to the RLC layer for RLC PDUs mapped to NACKed HARQ processes.
5. network node 14 and wireless device 12 flush the respective HARQ processes (transmit buffer and reception buffer).
6. an RLC status report for DL may be triggered to be sent to network node 14.
7. retransmission such as RLC retransmission, i.e., a procedure on a RLC layer, is performed for locally NACKed PDUs at wireless device 12.
8. network node 14 requests a buffer status report (BSR) to assess if a bigger grant is required for retransmission. In one or more embodiments, requesting the BSR, as described in action 8, is optional.
9. optionally, a scheduler can increase the transport block size (TBS) indicated in the UL grant to clear up the potential retransmissions as a preemptive approach. In one or more embodiments, increasing the TBS, as described in action 9, is optional.

In one or more embodiments, both network node 14 and wireless device 12 clear HARQ buffers where the respective buffers at network node 14 and wireless device 12 are not symmetric at the RLC level.

The disclosure describes a local NACK that is indicated from the MAC process, i.e., a procedure on a MAC layer, to the RLC process, i.e., a procedure on a RLC layer, in response to a "switch" or as a triggering action/event. In one or more embodiments, RLC process is a procedure involving transmission(s) and/or retransmission(s) on the RLC layer. In one or more, embodiments, MAC process is a procedure involving transmission(s) and/or retransmission(s) on the MAC layer.

switch means a TTI length switch, or a switch in the number of used/addressable HARQ processes, i.e., one or more of these actions are the triggering action;

at the time of the switch, selected HARQ processes are flushed; and

RLC retransmissions are triggered when Local NACK is indicated.

Figure 6:
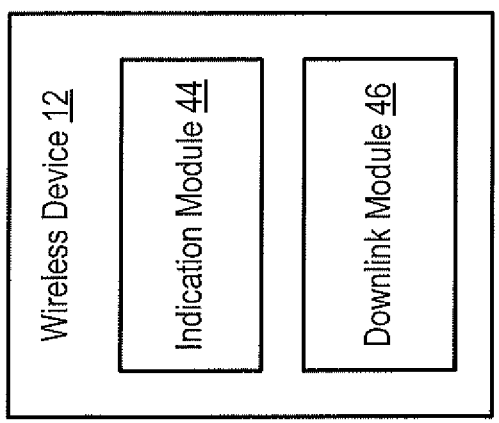
FIG. 6 is a block diagram of another embodiment of a wireless device in accordance with the principles of the disclosure.

FIG. 6 is a block diagram of another embodiment of wireless device 12. Wireless device 12 includes indication module 44 and downlink module 46 for performing functions as described for indication code 26 and downlink code 28, respectively. For example, indication module 44 is configured to stop a hybrid automatic repeat request, HARQ, process associated with data to be retransmitted, and retransmit the data where the retransmission of data is triggered based on a change of a Transmission Time Interval, TTI, length and associated with a process, i.e., a procedure, that is different from the stopped HARQ process. For example, downlink module 46 is configured to stop a HARQ process/processes associated with data to be retransmitted, and receive retransmitted data based on a process/procedure that is different from the stopped HARQ process. In one or more embodiments, the stopped HARQ process is a MAC process, i.e., a procedure on a MAC layer. In one or more embodiments, the process different from the stopped HARQ process is at a different layer than the layer of the stopped HARQ process, i.e., the procedure different from the stopped HARQ process is at a different layer such as a RLC layer than the layer of the stopped HARQ process.

Figure 7:
FIG. 7 is a block diagram of another embodiment of a network node in accordance with the principles of the disclosure.

FIG. 7 is a block diagram of another embodiment of network node 14. Network node 14 includes triggering module 48 and uplink module 50 for performing functions described with respect to triggering code 40 and uplink code 42, respectively. For example, triggering module 48 is configured to stop a HARQ process associated with data to be retransmitted, and retransmit the data using a process, i.e., procedure, that is different from the stopped HARQ process. For example, uplink module 50 is configured to stop a HARQ process associated with data to be retransmitted, and receive retransmission of data where the retransmission of data is triggered based on a change of a TTI length for transmission and associated with a process, i.e., procedure, that is different from the stopped HARQ process. In one or more embodiments, the stopped HARQ process is a MAC process, i.e., a procedure on a MAC layer. In one or more embodiments, the process, i.e., procedure, different from the stopped HARQ process is at a different layer than the layer of the stopped HARQ process.

Some Embodiments

Embodiment 1. A network node 14 for communication with a wireless device 12, the wireless device 12 configurable to operate using a transmission time interval (TTI) and a short TTI (sTTI), the sTTI having a shorter length than the TTI, the network node 14 comprising processing circuitry 34, the processing circuitry 34 configured to:

transmit signaling, the signaling configured to cause the wireless device 12 to one of: change a TTI length for transmission and change a number of used HARQ processes; and cause retransmission of data based on the signaling.

Embodiment 2. The network node 14 of Embodiment 1, wherein the change in TTI length for transmission includes switching between TTI and sTTI; and the change in the number of used HARQ processes includes changing between a first number of used HARQ processes and a second number of used HARQ processes, the first number of used HARQ processes being different from the second number of used HARQ processes.

Embodiment 3. The network node 14 of Embodiment 2, wherein the processing circuitry 34 is further configured to clear, flush, partially clear or partially flush one of the first number of used HARQ processes and second of used HARQ processes based on the signaling.

Embodiment 4. The network node 14 of Embodiment 1, wherein the signaling is a downlink assignment for communication on the TTI.

Embodiment 5. The network node 14 of Embodiment 1, wherein the node processing circuitry 34 is further configured to increase a transport block size (TBS) indicated in the assignment for retransmission; and the retransmission of data being transmitted on the increased TBS.

Embodiment 6. The network node 14 of Embodiment 1, wherein the retransmission is RLC retransmission.

Embodiment 7. The network node of Embodiment 1, wherein the first number of used HARQ processes are a first number of asynchronous HARQ processes; and the second number of used HARQ processes are a second number of synchronous HARQ processes.

Embodiment 8. A wireless device 12 for communication with a network node 14, the wireless device 12 being configurable to operate using a transmission time interval (TTI) and a short TTI (sTTI), the sTTI having a shorter length than the TTI, the wireless device 12 comprising processing circuitry 20, the processing circuitry 20 configured to:

receive signaling, the signaling configured to cause the wireless device 12 to one of change a TTI length for transmission and change a number of used HARQ processes; and receive retransmission of data, the retransmission of the data being associated with one of the changed TTI length and the changed number of used HARQ processes.

Embodiment 9. The wireless device 12 of Embodiment 8, wherein the signaling is a downlink assignment for TTI.

Embodiment 10. The wireless device 12 of Embodiment 8, wherein the signaling indicates an increase in a transport block size (TBS), the packet being received on the increased TBS.

Embodiment 11. A wireless device 12, the wireless device 12 configurable to operate using a transmission time interval (TTI) and a short TTI (sTTI), the sTTI having a shorter length than the TTI, the wireless device 12 comprising processing circuitry 20, the processing circuitry 20 configured to:

receive signaling, the signaling configured to cause the wireless device 12 to one of change a TTI length for transmission and change a number of used HARQ processes; and cause retransmission of data in response to one of the change of the TTI length for transmission and the change of the number of used HARQ processes.

Embodiment 12. The wireless device 12 of Embodiment 11, wherein the change in TTI length for transmission includes switching between TTI and sTTI; and the change in the number of used HARQ processes includes changing between a first number of used HARQ processes and a second number of used HARQ processes, the first number of used HARQ processes being different from the second number of used HARQ processes.

Embodiment 13. The wireless device 12 of Embodiment 11, wherein the first number of used HARQ processes are a first number of asynchronous HARQ processes; and the second number of used HARQ processes are a second number of synchronous HARQ processes.

Embodiment 14. The wireless device 12 of Embodiment 11, wherein the processing circuitry 20 is further configured to clear, flush, partially clear or partially flush one of the first number of used HARQ processes and second number of used HARQ processes, based on the signaling.

Embodiment 15. The wireless device 12 of Embodiment 11, wherein the signaling is an uplink grant for communication on the TTI.

Embodiment 16. The wireless device 12 of Embodiment 11, wherein the signaling is radio resource control (RRC) signaling.

Embodiment 17. The wireless device 12 of Embodiment 16, wherein the retransmission is RLC retransmission.

Embodiment 18. A network node 14 for communication with a wireless device, the wireless device 12 being configurable to operate using a transmission time interval (TTI) and a short TTI (sTTI), the sTTI have a shorter length than the TTI, the network node comprising processing circuitry 14, the processing circuitry 14 configured to:

transmit signaling, the signaling configured to cause the wireless device 12 to one of change a TTI length for transmission and change a number of used HARQ processes;

receive retransmission of data, the data being associated with one of:
 the change of the TTI length for transmission; and
  the change of the number of used HARQ processes.

Embodiment 19. The network node 14 of Embodiment 18, wherein the change of the TTI length includes switching between TTI and sTTI; and the change of the number of used HARQ processes includes changing between a first number of used HARQ processes and a second number of used HARQ processes, the first number of used HARQ processes being different from the second number of used HARQ processes.

Embodiment 20. The network node 14 of Embodiment 18, wherein the processing circuitry 34 is further configured to clear, flush, partially clear or partially flush one of the first number of used HARQ processes and second number of used HARQ processes, based on the signaling.

Embodiment 21. The network node 14 of Embodiment 18, wherein the signaling is an uplink grant for uplink transmission on the TTI.

Embodiment 22. A method for a network node 14 for communication with a wireless device 12, the wireless device 12 configurable to operate using a transmission time interval (TTI) and a short TTI (sTTI), the sTTI having a shorter length than the TTI, the method comprising:

transmitting signaling, the signaling configured to cause the wireless device 12 to one of change a TTI length for transmission and change a number of used HARQ processes; and causing retransmission of data in response to the signaling.

Embodiment 23. The method of Embodiment 22, wherein the change in TTI length for transmission includes switching between TTI and sTTI; and the change in the number of used HARQ processes includes changing between a first number of used HARQ processes and a second number of used HARQ processes, the first number of used HARQ processes being different from the second number of used HARQ processes.

Embodiment 24. The method of Embodiment 23, further comprising clearing, flushing, partially clearing or partially flushing one of the first number of used HARQ processes and second of used HARQ processes based on the signaling.

Embodiment 25. The method of Embodiment 22, wherein the signaling is a downlink assignment for communication on the TTI.

Embodiment 26. The method of Embodiment 22, further comprising increasing a transport block size (TBS) indicated in the assignment for retransmission; and the retransmission is transmitted on the increased TBS.

Embodiment 27. The method of Embodiment 22, wherein the retransmission is RLC retransmission.

Embodiment 28. The method of Embodiment 27, wherein the first number of used HARQ processes are a first number of asynchronous HARQ processes; and the second number of used HARQ processes are a second number of synchronous HARQ processes.

Embodiment 29. A method for wireless device 12 for communication with a network node 14, the wireless device 12 being configurable to operate using a transmission time interval (TTI) and a short TTI (sTTI), the sTTI having a shorter length than the TTI, the method comprising:

receiving signaling to cause the wireless device to one of change a TTI length for transmission and change a number of used HARQ processes; and receiving retransmission of data, the retransmission of the data being associated with one of the changed TTI length and the changed number of used HARQ processes.

Embodiment 30. The method of Embodiment 29, wherein the signaling is a downlink assignment for TTI.

Embodiment 31. The method of Embodiment 30, wherein the signaling indicates an increase in a transport block size (TBS), the packet being received on the increased TBS.

Embodiment 32. A method for a wireless device 12, the wireless device 12 configurable to operate using a transmission time interval (TTI) and a short TTI (sTTI), the sTTI having a shorter length than the TTI, the method comprising:

receiving signaling, the signaling configured to cause the wireless device 12 to one of change a TTI length for transmission and change a number of used HARQ processes; and causing retransmission of data in response to one of the change of the TTI length for transmission and the change of the number of used HARQ processes.

Embodiment 33. The method of Embodiment 32, wherein the change in TTI length for transmission includes switching between TTI and sTTI; and the change in the number of used HARQ processes includes changing between a first number of used HARQ processes and a second number of used HARQ processes, the first number of used HARQ processes being different from the second number of used HARQ processes.

Embodiment 34. The method of Embodiment 33, further comprising clearing, flushing, partially clearing or partially flushing one of the first number of used HARQ processes and second number of used HARQ processes, based on the signaling.

Embodiment 35. The method of Embodiment 32, wherein the first number of used HARQ processes are a first number of asynchronous HARQ processes; and the second number of used HARQ processes are a second number of synchronous HARQ processes.

Embodiment 36. The method of Embodiment 32, wherein the signaling is an uplink grant is for communication on the TTI.

Embodiment 37. The method of Embodiment 32, wherein the signaling is radio resource control (RRC) signaling.

Embodiment 38. The method of Embodiment 37, wherein the retransmission is RLC retransmission.

Embodiment 39. A method for a network node 14 for communication with a wireless device 12, the wireless device 12 being configurable to operate using a transmission time interval (TTI) and a short TTI (sTTI), the sTTI have a shorter length than the TTI, the method comprising:

transmitting signaling, the signaling configured to cause the wireless device 12 to one of: change a TTI length for transmission and change a number of used HARQ processes; and receiving retransmission of data, the data being associated with one of:

the change of the TTI length for transmission; and the change of the number of used HARQ processes.

Embodiment 40. The method of Embodiment 39, wherein the change in TTI length includes switching between TTI and sTTI; and the change in the number of used HARQ processes includes changing between a first number of used HARQ processes and a second number of used HARQ processes, the first number of used HARQ processes being different from the second number of used HARQ processes.

Embodiment 41. The method of Embodiment 40, further comprising clearing, flushing, partially clearing or partially flushing one of the first number of used HARQ processes and second number of used HARQ processes, based on the signaling.

Embodiment 42. The method of Embodiment 39, wherein the signaling is an uplink transmission on the TTI.

Embodiment 43. A network node 14 for communication with a wireless device 12, the wireless device 12 configurable to operate using a transmission time interval (TTI) and a short TTI (sTTI), the sTTI having a shorter length than the TTI, the network node 14 comprising:

a triggering module 48 configured to:

transmit signaling, the signaling configured to cause the wireless device 12 to one of: change a TTI length for transmission and change a number of used HARQ processes; and cause retransmission of data based on the signaling.

Embodiment 44. A wireless device 12 for communication with a network node 14, the wireless device 12 being configurable to operate using a transmission time interval (TTI) and a short TTI (sTTI), the sTTI having a shorter length than the TTI, the wireless device 12 comprising:

a downlink module 46 configured to:

receive signaling, the signaling configured to cause the wireless device 12 to one of change a TTI length for transmission and change a number of used HARQ processes; and receive retransmission of data, the retransmission of the data being associated with one of the changed TTI length and the changed number of used HARQ processes.

Embodiment 45. A wireless device 12, the wireless device 12 configurable to operate using a transmission time interval (TTI) and a short TTI (sTTI), the sTTI having a shorter length than the TTI, the wireless device 12 comprising:

an indication module 44 configured to:

receive signaling, the signaling configured to cause the wireless device 12 to one of change a TTI length for transmission and change a number of used HARQ processes; and cause retransmission of data in response to one of the change of the TTI length for transmission and the change of the number of used HARQ processes.

Embodiment 46. A network node 14 for communication with a wireless device 12, the wireless device 12 being configurable to operate using a transmission time interval (TTI) and a short TTI (sTTI), the sTTI have a shorter length than the TTI, the network node 14 comprising:

an uplink module 50 configured to:

transmit signaling, the signaling configured to cause the wireless device 12 to one of change a TTI length for transmission and change a number of used HARQ processes; and receive retransmission of data, the data being associated with one of:

the change of the TTI length for transmission; and the change of the number of used HARQ processes.

Some Other Embodiments

According to one aspect of the disclosure, a network node 14 is provided. The network node includes processing circuitry 34 in which the processing circuitry 34 is configured to stop a hybrid automatic repeat request, HARQ, process associated with data to be retransmitted, and retransmit the data using a procedure that is different from the stopped HARQ process.

According to one embodiment of this aspect, the stopped HARQ process is a procedure on a Medium Access Control, MAC, layer and/or the procedure that is different from the stopped HARQ process is a procedure on a Radio Link Control, RLC, layer. According to one embodiment of this aspect, the processing circuitry 34 is further configured to communicate a trigger at a level higher than a Medium Access Control, MAC, layer to cause transmission of the data using the procedure that is different from the stopped HARQ process.

According to one embodiment of this aspect, the trigger is a Radio Link Control, RLC, trigger that is communicated from the MAC layer to a Radio Link Control, RLC, layer. According to one embodiment of this aspect, the processing circuitry 34 is further configured to indicate a change in Transmission Time Interval, TTI, length. According to one embodiment of this aspect, the change in TTI length causes a change in a number of HARQ process quantity. According to one embodiment of this aspect, the indication of the change of the TTI length is included in a downlink assignment. According to one embodiment of this aspect, the processing circuitry 34 is further configured to at least partially flush the stopped HARQ process. According to one embodiment of this aspect, the stopped HARQ process associated with data to be retransmitted is associated with at least one communicated NACK.

According to one aspect of the disclosure, a wireless device 12 including processing circuitry 20 is provided. The processing circuitry 20 is configured to stop a hybrid automatic repeat request, HARQ, process associated with data to be retransmitted, and receive retransmitted data based on a procedure that is different from the stopped HARQ process.

According to one embodiment of this aspect, the stopped HARQ process is a procedure on a Medium Access Control, MAC, layer and/or the procedure that is different from the stopped HARQ process is a procedure on a Radio Link Control, RLC, layer. According to one embodiment of this aspect, the processing circuitry 20 is further configured to receive an indication corresponding to a change in Transmission Time Interval, TTI, length.

According to one embodiment of this aspect, the change in TTI length causes a change in a number of HARQ process quantity. According to one embodiment of this aspect, the indication of the change of the TTI length is included in a downlink assignment. According to one embodiment of this aspect, the processing circuitry 20 is further configured to at least partially flush the stopped HARQ process. According to one embodiment of this aspect, the stopped HARQ process associated with data to be retransmitted is associated with at least one communicated NACK.

According to one aspect of the disclosure, a network node 14 is provided. The network node 14 includes processing circuitry 34. The processing circuitry 34 is configured to stop a Hybrid automatic repeat request, HARQ, process associated with data to be retransmitted, and receive retransmission of data in which the retransmission of data is triggered based on a change of a TTI length for transmission and associated with a procedure that is different from the stopped HARQ process.

According to one embodiment of this aspect, the stopped HARQ process is a procedure on a Medium Access Control, MAC, layer and/or the procedure that is different from the stopped HARQ process is a procedure on a Radio Link Control, RLC, layer. According to one embodiment of this aspect, the processing circuitry 34 is further configured to indicate a change in Transmission Time Interval, TTI, length. According to one embodiment of this aspect, the change in TTI length causes a change in a number of HARQ process quantity.

According to one embodiment of this aspect, the indication of the change of the TTI length is included in an uplink grant. According to one embodiment of this aspect, the processing circuitry 34 is further configured to at least partially flush the stopped HARQ process. According to one embodiment of this aspect, the stopped HARQ process associated with data to be retransmitted is associated with at least one communicated NACK.

According to one embodiment of the disclosure, a wireless device 12 includes processing circuitry 20. The processing circuitry 20 is configured to stop a hybrid automatic repeat request, HARQ, process associated with data to be retransmitted, and retransmit the data. The retransmission of data is triggered based on a change of a Transmission Time Interval, TTI, length and associated with a procedure that is different from the stopped HARQ process.

According to one embodiment of this aspect, the stopped HARQ process is a procedure on a Medium Access Control, MAC, layer and/or the procedure that is different from the stopped HARQ process is a procedure on a Radio Link Control, RLC, layer. According to one embodiment of this aspect, the processing circuitry 20 is further configured to receive an indication of a change in Transmission Time Interval, TTI, length.

According to one embodiment of this aspect, the change in TTI length causes a change in a number of HARQ process quantity. According to one embodiment of this aspect, the indication of the change of the TTI length is included in an uplink assignment. According to one embodiment of this aspect, the processing circuitry 20 is further configured to at least partially flush the stopped HARQ process. According to one embodiment of this aspect, the stopped HARQ process associated with data to be retransmitted is associated with at least one communicated NACK.

According to one aspect of the disclosure, a method for a network node 14 is provided. A hybrid automatic repeat request, HARQ, process associated with data to be retransmitted is stopped. The data is retransmitted using a procedure that is different from the stopped HARQ process.

According to one embodiment of this aspect, the stopped HARQ process is a procedure on a Medium Access Control, MAC, layer and/or the procedure that is different from the stopped HARQ process is a procedure on a Radio Link Control, RLC, layer. According to one embodiment of this aspect, a trigger at a level higher than a Medium Access Control, MAC, layer is communicated to cause transmission of the data using the procedure that is different from the stopped HARQ process. According to one embodiment of this aspect, the trigger is a Radio Link Control, RLC, trigger that is communicated from the MAC layer to a Radio Link Control, RLC, layer.

According to one embodiment of this aspect, a change in Transmission Time Interval, TTI, length is indicated. According to one embodiment of this aspect, the change in TTI length causes a change in a number of HARQ process quantity. According to one embodiment of this aspect, the indication of the change of the TTI length is included in a downlink assignment. According to one embodiment of this aspect, the stopped HARQ process is at least partially flushed.

According to one embodiment of this aspect, the stopped HARQ process associated with data to be retransmitted is associated with at least one communicated NACK. According to one aspect of the disclosure, a method for a wireless device 12 is provided. A hybrid automatic repeat request, HARQ, process associated with data to be retransmitted is stopped. Retransmitted data is received based on a procedure that is different from the stopped HARQ process. According to one embodiment of this aspect, the stopped HARQ process is a procedure on a Medium Access Control, MAC, layer and/or the procedure that is different from the stopped HARQ process is a procedure on a Radio Link Control, RLC, layer.

According to one embodiment of this aspect, an indication corresponding to a change in Transmission Time Interval, TTI, length is received. According to one embodiment of this aspect, the change in TTI length causes a change in a number of HARQ process quantity. According to one embodiment of this aspect, the indication of the change of the TTI length is included in a downlink assignment. According to one embodiment of this aspect, the stopped HARQ process is at least partially flushed. According to one embodiment of this aspect, the stopped HARQ process associated with data to be retransmitted is associated with at least one communicated NACK.

According to one aspect of the disclosure, a method for a network node 14 is provided. A Hybrid automatic repeat request, HARQ, process associated with data to be retransmitted is stopped. Retransmission of data is received. The retransmission of data is triggered based on a change of a TTI length for transmission and associated with a procedure that is different from the stopped HARQ process. According to one embodiment of this aspect, the stopped HARQ process is a procedure on a Medium Access Control, MAC, layer and/or the procedure that is different from the stopped HARQ process is a procedure on a Radio Link Control, RLC, layer.

According to one embodiment of this aspect, a change in Transmission Time Interval, TTI, length is indicated. According to one embodiment of this aspect, the change in TTI length causes a change in a number of HARQ process quantity. According to one embodiment of this aspect, the indication of the change of the TTI length is included in an uplink grant. According to one embodiment of this aspect, the stopped HARQ process is at least partially flushed. According to one embodiment of this aspect, the stopped HARQ process associated with data to be retransmitted is associated with at least one communicated NACK.

According to one embodiment of the disclose, a method for wireless device 12 is provided. A hybrid automatic repeat request, HARQ, process associated with data to be retransmitted is stopped. The data is retransmitted. The retransmission of data is triggered based on a change of a Transmission Time Interval, TTI, length and associated with a procedure that is different from the stopped HARQ process.

According to one embodiment of this aspect, the stopped HARQ process is a procedure on a Medium Access Control, MAC, layer and/or the procedure that is different from the stopped HARQ process is a procedure on a Radio Link Control, RLC, layer. According to one embodiment of this aspect, an indication of a change in Transmission Time Interval, TTI, length is received.

According to one embodiment of this aspect, the change in TTI length causes a change in a number of HARQ process quantity. According to one embodiment of this aspect, the indication of the change of the TTI length is included in an uplink assignment. According to one embodiment of this aspect, the stopped HARQ process is at least partially flushed. According to one embodiment of this aspect, the stopped HARQ process associated with data to be retransmitted is associated with at least one communicated NACK.

With the teachings in the disclosure, TTI lengths switch can be handled efficiently, i.e., does not lead to unwanted delay spikes for the data delivery (which was due to data loss during a TTI length switch at MAC). This way, specific low-latency and reliable communication use case requirements can be guaranteed enabling e.g. new critical machine communication use cases.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node, the network node comprising processing circuitry, the processing circuitry configured to:
   stop a hybrid automatic repeat request, HARQ, process associated with data to be retransmitted upon occurrence of a change of a transmission time interval, TTI, length;
   send a local negative acknowledgement, NACK, indicating lost data that corresponds to the stopped HARQ process; and
   retransmit, after the change of the TTI length, the data using a procedure that is different from the stopped HARQ process, the retransmitted data including the lost data indicated by the local NACK and corresponding to the stopped HARQ process.

2. The network node of claim 1, wherein at least one of:
   the stopped HARQ process is a procedure on a Medium Access Control, MAC, layer and
   the procedure that is different from the stopped HARQ process is a procedure on a Radio Link Control, RLC, layer.

3. The network node of claim 1, wherein the processing circuitry is further configured to communicate a trigger at a level higher than a Medium Access Control, MAC, layer to cause transmission of the data using the procedure that is different from the stopped HARQ process.

4. The network node of claim 3, wherein the trigger is a Radio Link Control, RLC, trigger that is communicated from the MAC layer to a Radio Link Control, RLC, layer.

5. The network node of claim 1, wherein the processing circuitry is further configured to at least one selected from the group consisting of:
   indicate a change in Transmission Time Interval, TTI, length; and
   the retransmitting using the different procedure is on a TTI length which is changed from a TTI length of the stopped HARQ process.

6. The network node of claim 5, wherein one of the change in TTI length causes a change in a number of HARQ process quantity, and the indication of the change of the TTI length is included in a downlink assignment.

7. The network node of claim 1, wherein the processing circuitry is further configured to at least partially flush the stopped HARQ process.

8. The network node of claim 1, wherein the stopped HARQ process associated with data to be retransmitted is associated with at least one non-local NACK.

9. A wireless device comprising processing circuitry, the processing circuitry configured to:
   stop a hybrid automatic repeat request, HARQ, process associated with data to be retransmitted upon occurrence of a change of a transmission time interval, TTI, length;
   and
   receive, after the change of the TTI length, retransmitted data based on a procedure that is different from the stopped HARQ process, the retransmitted data including lost data indicated by a local NACK and corresponding to the stopped HARQ process.

10. The wireless device of claim 9, wherein at least one of:
   the stopped HARQ process is a procedure on a Medium Access Control, MAC, layer; and the procedure that is different from the stopped HARQ process is a procedure on a Radio Link Control, RLC, layer.

11. The wireless device of claim 9, wherein the processing circuitry is further configured to at least one selected from the group consisting of:
receive an indication corresponding to a change in Transmission Time Interval, TTI, length; and
the receiving the retransmitted data using the different procedure is on a TTI length which is changed from a TTI length of the stopped HARQ process.

12. The wireless device of claim 11, wherein one of the change in TTI length causes a change in a number of HARQ process quantity and the indication of the change of the TTI length is included in a downlink assignment.

13. The wireless device of claim 9, wherein the processing circuitry is further configured to at least partially flush the stopped HARQ process.

14. The wireless device of claim 9, wherein the stopped HARQ process associated with data to be retransmitted is associated with at least one non-local NACK.

15. A method for a network node, the method comprising:
stopping a hybrid automatic repeat request, HARQ, process associated with data to be retransmitted upon occurrence of a change of a transmission time interval, TTI, length;
sending a local negative acknowledgement, NACK, indicating lost data that corresponds to the stopped HARQ process; and
retransmitting, after the change of the TTI length, the data using a procedure that is different from the stopped HARQ process, the retransmitted data including the lost data indicated by the local NACK and corresponding to the stopped HARQ process.

16. The method of claim 15, wherein at least one of:
the stopped HARQ process is a procedure on a Medium Access Control, MAC, layer; and
the procedure that is different from the stopped HARQ process is a procedure on a Radio Link Control, RLC, layer.

17. The method of claim 15, further comprising communicating a trigger at a level higher than a Medium Access Control, MAC, layer to cause transmission of the data using the procedure that is different from the stopped HARQ process.

18. The method of claim 17, wherein the trigger is a Radio Link Control, RLC, trigger that is communicated from the MAC layer to a Radio Link Control, RLC, layer.

19. The method of claim 15, further comprising at least one selected from the group consisting of:
indicating a change in Transmission Time Interval, TTI, length; and
the retransmitting the data using the different procedure is on a TTI length which is changed from a TTI length of the stopped HARQ process.

20. The method of claim 19, wherein one of the change in TTI length causes a change in a number of HARQ process quantity and the indication of the change of the TTI length is included in a downlink assignment.

21. The method of any one of claim 15, further comprising at least partially flushing the stopped HARQ process.

22. A method for a wireless device, the method comprising:
stopping a hybrid automatic repeat request, HARQ, process associated with data to be retransmitted upon occurrence of a change of a transmission time interval, TTI, length;
and
receiving, after the change of the TTI length, retransmitted data based on a procedure that is different from the stopped HARQ process, the retransmitted data including lost data indicated by the local NACK and corresponding to the stopped HARQ process.

23. The method of claim 22, wherein at least one of:
the stopped HARQ process is a procedure on a Medium Access Control, MAC, layer; and
the procedure that is different from the stopped HARQ process is a procedure on a Radio Link Control, RLC, layer.

24. The method of claim 22, further comprising at least one selected from the group consisting of:
receiving an indication corresponding to a change in Transmission Time Interval, TTI, length; and
the receiving the retransmitted data using the different procedure is on a TTI length which is changed from a TTI length of the stopped HARQ process.

25. The method of claim 24, wherein one of the change in TTI length causes a change in a number of HARQ process quantity and the indication of the change of the TTI length is included in a downlink assignment.

26. The method of claim 22, further comprising at least partially flushing the stopped HARQ process.

27. The method of claim 22, wherein the stopped HARQ process associated with data to be retransmitted is associated with at least one non-local NACK.

* * * * *